(12) United States Patent
Ishikawa et al.

(10) Patent No.: US 7,856,177 B2
(45) Date of Patent: Dec. 21, 2010

(54) LENS APPARATUS AND CAMERA

(75) Inventors: Masanori Ishikawa, Saitama (JP); Jun Sugita, Saitama (JP); Hiroshi Akada, Kawasaki (JP); Katsuhiro Inoue, Utsunomiya (JP); Sawako Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 12/206,953

(22) Filed: Sep. 9, 2008

(65) Prior Publication Data

US 2009/0080875 A1    Mar. 26, 2009

(30) Foreign Application Priority Data

Sep. 21, 2007 (JP) .............................. 2007-245543

(51) Int. Cl.
*G03B 17/00* (2006.01)
(52) U.S. Cl. ....................................................... 396/55
(58) Field of Classification Search ................. 396/50, 396/52–53, 55; 348/208.99; 359/554
See application file for complete search history.

(56) References Cited

U.S. PATENT DOCUMENTS

| 6,064,826 A | 5/2000 | Washisu |
| 2007/0146883 A1* | 6/2007 | Akada et al. ................. 359/554 |

FOREIGN PATENT DOCUMENTS

| JP | 7-199263 A | 8/1995 |
| JP | 8-184870 A | 7/1996 |
| JP | 9-090456 A | 4/1997 |
| JP | 2003-091028 A | 3/2003 |
| JP | 2005-202358 A | 7/2005 |
| JP | 2006-220758 A | 8/2006 |
| JP | 2007-065397 A | 3/2007 |
| JP | 2007-121501 A | 5/2007 |

OTHER PUBLICATIONS

JP2005-202358 Machine Translation available from JPO website.*

* cited by examiner

*Primary Examiner*—W. B. Perkey
*Assistant Examiner*—Minh Q Phan
(74) *Attorney, Agent, or Firm*—Canon U.S.A., Inc. I.P. Division

(57) ABSTRACT

An optical apparatus includes a photographic optical system including an image stabilizing unit supported by a support member via a plurality of elastic members, an actuator configured to drive the image stabilizing unit in a direction perpendicular to an optical axis thereof, a position detection unit configured to detect a position in the direction perpendicular to the optical axis of the image stabilizing unit, a gravitational direction determination unit configured to determine a gravitational direction based on an output from the position detection unit, a setting unit configured to set a holding position at which the image stabilizing unit is held based on information concerning the gravitational direction output from the gravitational direction determination unit, and a control unit configured to control the actuator based on information concerning the holding position to move the image stabilizing unit to the holding position.

7 Claims, 7 Drawing Sheets

LENS APPARATUS AND CAMERA

BACKGROUND OF THE INVENTION

1. Field of the Invention

The present invention relates to a lens apparatus attachable to a camera body, a camera system including the lens apparatus, and a camera having an optical image stabilizing unit for reducing an image shake caused by vibrations, such as a camera shake.

2. Description of the Related Art

Japanese Patent Application Laid-Open No. 8-184870 discusses an optical apparatus having an optical image stabilizing unit for reducing image blurring caused by vibrations, such as camera shake.

The optical apparatus discussed in Japanese Patent Application Laid-Open No. 8-184870 has an image stabilizing unit supported by an elastic member. In this optical apparatus, a locking mechanism for fixing the image stabilizing optical unit, when an image stabilization operation is off, is unnecessary.

In this optical apparatus, the elastic force of the elastic member is set to cancel the self-weight of the image stabilizing unit. Thus, the image stabilizing unit is set to align with an optical axis when an image stabilization operation is off.

Generally, the optical performance (or lack of optical aberration) of a photographic optical system is basically designed to be best under the condition where the optical axis is not bent. Accordingly, the larger a deviation angle to the optical axis (i.e., an inclined angle of an exit light axis to an incident light axis) becomes, the greater the degradation of an image, such as chromatic aberration or reduction of marginal luminance, increases.

Therefore, to obtain the best optical performance, preferably, the image stabilizing optical unit is held as close to the optical axis as possible by increasing the elastic force of the elastic member to decrease an amount of drop of the image stabilizing optical unit due to the self-weight thereof.

In view of electric power saving, there is a conflicting demand to decrease the elastic force for decreasing the driving force needed to move the image stabilizing optical unit.

Japanese Patent Application Laid-Open No. 7-199263 (corresponding to U.S. Pat. No. 6,064,826) discusses a change of the driving range in a direction perpendicular to an optical axis of an image stabilizing optical unit according to a focal length of a photographic optical system.

However, the apparatuses respectively discussed in Japanese Patent Application Laid-Open No. 7-199263 and Japanese Patent Application Laid-Open No. 8-184870 do not consider the posture change of a camera (e.g., a posture change between a portrait orientation and a landscape orientation). Thus, the image stabilizing optical unit may greatly deviate from an optical axis position. Accordingly, there may occur an inappropriate image stabilizing operation.

SUMMARY OF THE INVENTION

The present invention is directed to a lens apparatus and a camera, which can perform a favorable image stabilizing operation within an allowable range of the optical performance (e.g., optical aberration) according to a posture change of an optical apparatus, such as a lens apparatus and a camera, and which can reduce electric power consumption.

According to an aspect of the present invention, an optical apparatus, such as a lens apparatus, a camera system including an interchangeable lens, and a camera, includes a photographic optical system including an image stabilizing unit supported by a support member via a plurality of elastic members, an actuator configured to drive the image stabilizing unit in a direction perpendicular to an optical axis thereof, a position detection unit configured to detect a position of the image stabilizing unit in the direction perpendicular to the optical axis, a gravitational direction determination unit configured to determine a gravitational direction based on an output from the position detection unit, a setting unit configured to set a holding position at which the image stabilizing unit is held based on information concerning the gravitational direction output from the gravitational direction determination unit, and a control unit configured to control the actuator based on information concerning the holding position to move the image stabilizing unit to the holding position.

According to another aspect of the present invention, an optical apparatus, such as a lens apparatus, a camera system including an interchangeable lens, and a camera, includes a photographic optical system including an image stabilizing unit supported by a support member via a plurality of elastic members, an actuator configured to drive the image stabilizing unit in a direction perpendicular to an optical axis thereof, a vibration detection unit configured to detect a vibration, a position detection unit configured to detect a position of the image stabilizing unit in the direction perpendicular to the optical axis, a gravitational direction determination unit configured to determine a gravitational direction based on information concerning a driving target position of the image stabilizing unit determined according to an output from the vibration detection unit and on the output from the position detection unit, a setting unit configured to set a driving range in the direction perpendicular to the optical axis of the image stabilizing unit based on information concerning the gravitational direction output from the gravitational direction determination unit, and a control unit configured to control the actuator based on an output from the vibration detection unit and information concerning the driving range to move the image stabilizing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will now be described in detail with reference to the drawings.

Figure 1:
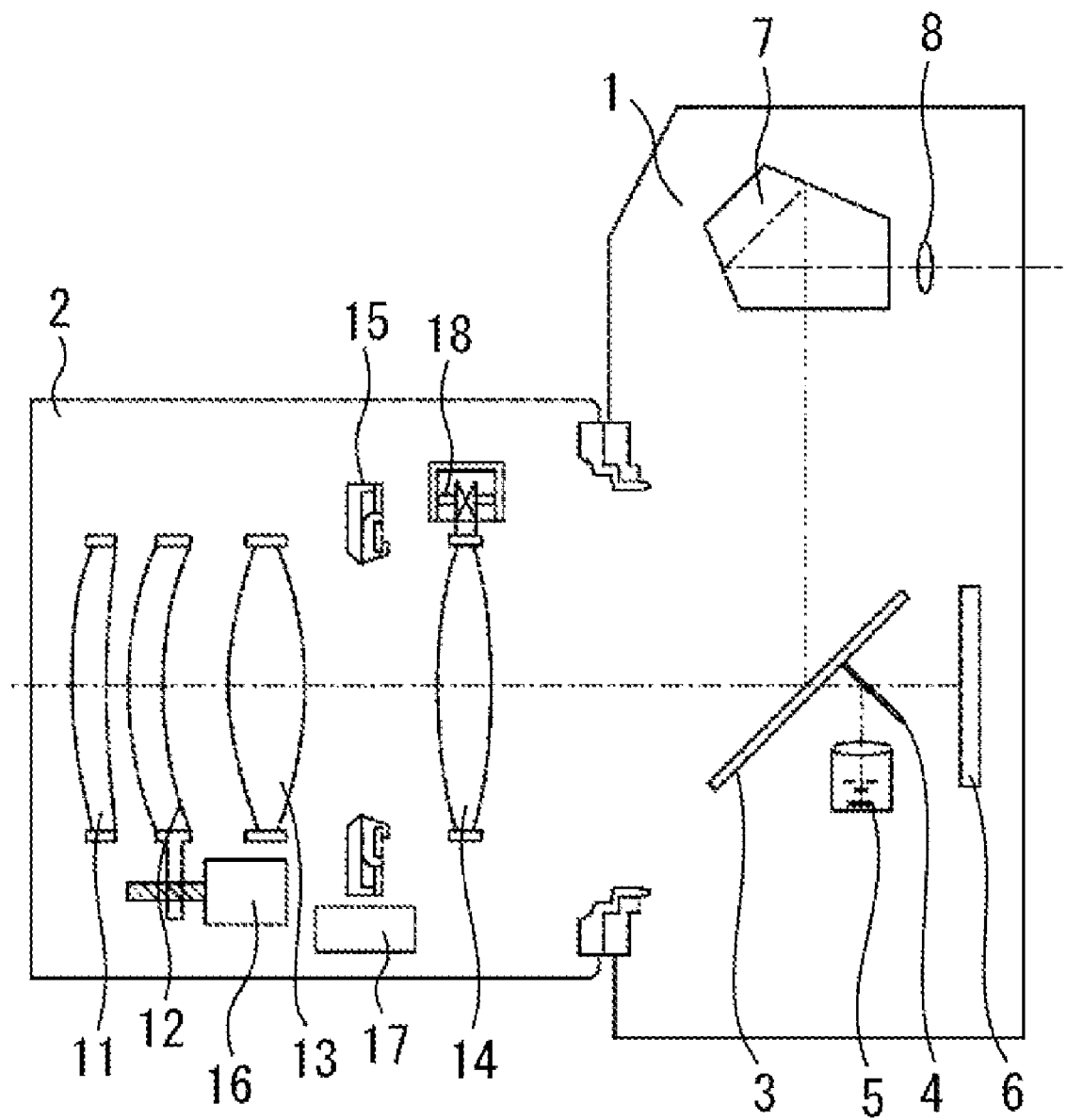
FIG. 1 is a cross-sectional view illustrating a lens-interchangeable type single-lens reflex (SLR) digital camera according to an exemplary embodiment of the present invention.

FIG. 1 illustrates a lens-interchangeable type SLR digital camera according to an exemplary embodiment of the present invention. As illustrated in FIG. 1, this SLR camera includes a camera body 1.

An interchangeable lens 2 is attached to the camera body 1.

That is, the lens interchangeable type SLR digital camera according to the exemplary embodiment of the present invention is an optical apparatus that includes the camera body 1 and the interchangeable lens 2 detachably attached to the camera body 1.

The camera body 1 has the following components.

A mirror 3 is located on an optical axis of a light flux passing through the interchangeable lens 2 before photographing is started. The mirror 3 reflects a part of the light flux to a finder optical system. In addition, through the mirror 3 a part of the light flux is lead to a focus detection unit 5 via a sub-mirror 4. During photographing, the mirror 3 is moved away from the optical axis. The focus detection unit 5 includes a condenser lens which splits an incident light flux into two light fluxes, two separator lenses which re-image the two light fluxes, and a phase difference type automatic focusing (AF) sensor, line sensors such as charge coupled devices (CCDs), which perform photoelectric conversion of the two re-focused object images. An image sensor 6, such as a complementary metal oxide semiconductor (CMOS) sensor or a CCD sensor, on which a light flux passing through the interchangeable lens 2 forms an image during photographing, performs photoelectric conversion of the focused object image.

The finder optical system includes a pentagonal prism 7 and a finder optical unit 8.

The photographic optical system constituting the interchangeable lens 2 has the following components, i.e., a first lens unit 11, a second lens unit 12 moveable for focusing, a third lens unit 13 moveable for magnification-varying, and a fourth lens unit 14 (an image stabilizing unit). The amount of photographing light flux passing through the first, second, third, and fourth lens units is limited by a diaphragm 15.

The second lens unit 12 receives a driving force from an AF drive motor 16 and moves along the optical axis to perform focusing.

The third lens unit 13 is driven in the direction of the optical axis by a transmission mechanism of a zoom ring (not shown). The zoom ring can be operated by a photographer, and the transmission mechanism converts the operated force into a driving force acting in the direction of the optical axis to vary magnification.

The fourth lens unit 14 (the image stabilizing unit) receives a driving force from an image stabilizing drive actuator 18, which is driven based on a detection output from an angular vibration detection sensor 17 including a gyroscope. Thus, the fourth lens unit 14 is moved in a direction perpendicular to the optical axis to perform angular vibration correction by bending the optical axis.

Figure 2:
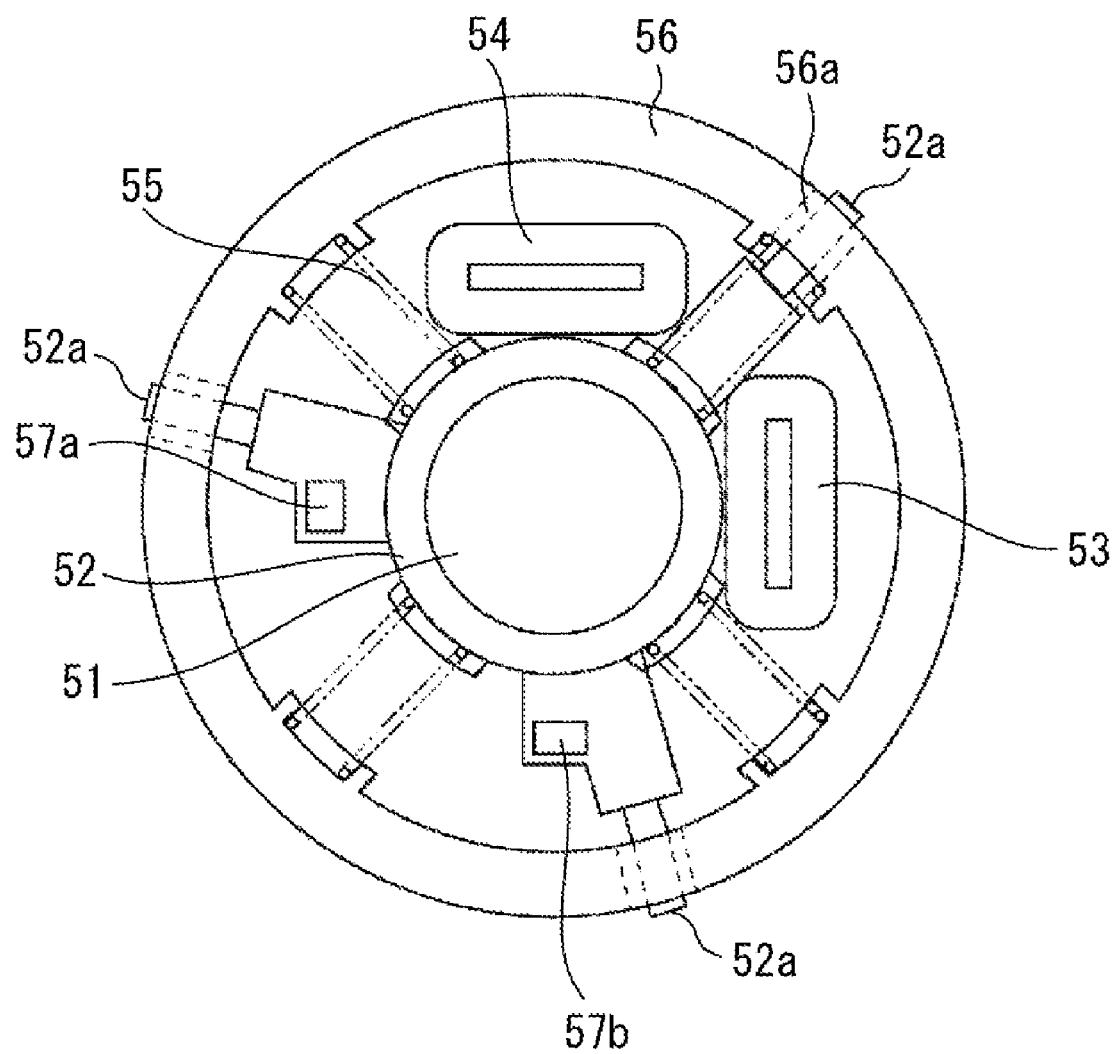
FIG. 2 is a detailed view illustrating an image stabilizing mechanism according to an exemplary embodiment of the present invention.

FIG. 2 illustrates the image stabilizing unit 14, which is movable in a direction perpendicular to the optical axis, and the image stabilizing drive actuator 18 illustrated in FIG. 1 in detail. In FIG. 2, a lens 51, which is a component of the image stabilizing unit 14, is held by a lens barrel 52.

The lens barrel 52 has a pin 52a which engages with a slotted hole 56a formed in a base barrel 56 (to be described below) and supports the lens 51 so that the lens 51 is movable in a direction perpendicular to the optical axis. The lens barrel also restrains the lens 51 from tilting with respect to the direction of the optical axis. In addition, the lens barrel 52 and the base barrel 56 have a plurality of pins 52a and cams 56a, respectively.

A driving coil 53 is integrally attached to the lens barrel 52 to drive the lens barrel 52 in the vertical direction. The driving coil 53 is disposed to face a permanent magnet (not shown) provided on the base barrel 56. The driving coil 53 can be energized to generate a driving force in the vertical direction.

A driving coil 54 is integrally attached to the lens barrel 52 to drive the lens barrel 52 in the horizontal direction. The driving coil 54 is disposed to face a permanent magnet (not shown) provided on the base barrel 56. The driving coil 54 can be energized to generate a driving force in the horizontal direction.

Compression springs 55 are elastic members for urging the lens barrel 52 from four directions. Although the present embodiment uses a compression spring as the elastic member, a tension spring can be used, instead of the compression spring. The present embodiment includes a plurality of such elastic members.

A holding position of the lens barrel 52 is determined by the balance between the elastic force of the compression spring 55 and the self-weight of the image stabilizing optical unit 14, which includes the lens 51 and the lens barrel 52, when the driving coils 53 and 54 are not energized. On the other hand, when the driving coils 53 and 54 are energized, the position of the lens barrel 52 is determined by the balance between the elastic force of the compression spring 55 and the sum of the driving force generated by the driving coils 53 and 54 and the force of the gravity due to the self-weight of the lens barrel 52.

The base barrel 56 (a stationary member, i.e. one which does not move for image stabilization) supports the entire image stabilizing optical unit 14 via a plurality of compression springs 55. Sensor magnets 57a and 57b are integrally fixed to the lens barrel 52.

The sensor magnets 57a and 57b face Hall elements (not shown) attached to the base barrel 56. The sensor magnets 57a and 57b move together with the lens barrel 52. Thus, the position of the image stabilizing optical unit 14 is detected.

Figure 3:
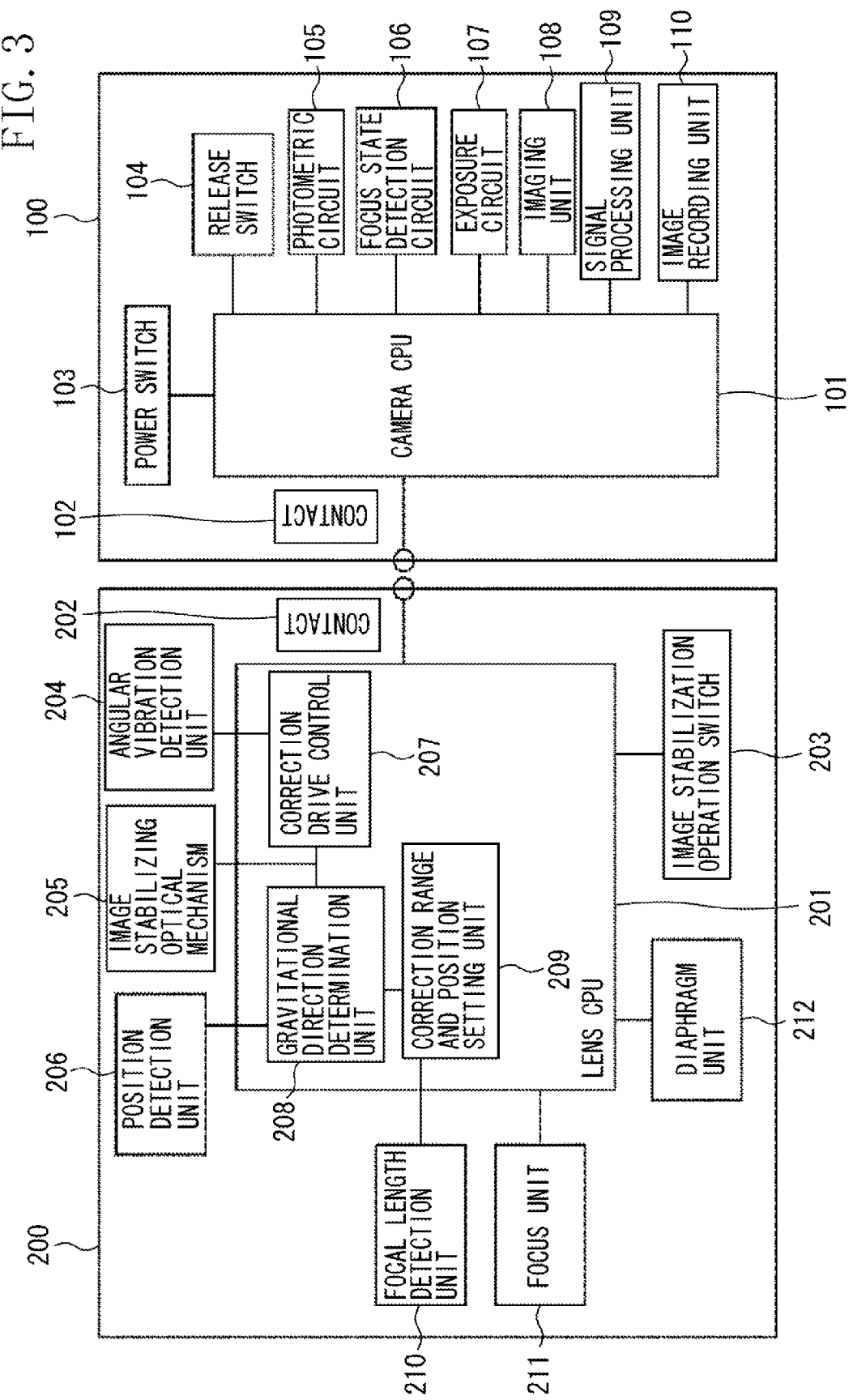
FIG. 3 is a block diagram illustrating a lens-interchangeable type SLR digital camera system according to an exemplary embodiment of the present invention.

FIG. 3 is a block diagram illustrating a lens-interchangeable type SLR digital camera system, which includes a camera body 100 and an interchangeable lens 200 corresponding to the camera body 1 and the interchangeable lens 2 illustrated in FIG. 1.

A camera central processing unit (CPU) 101 is a microcomputer.

The camera CPU 101 controls operation of each portion in the camera body 100. When the interchangeable lens 200 is attached to the camera body 100, the camera CPU 101 transmits and receives information to and from a lens CPU 201 via a camera contact 102.

The information transmitted by the camera CPU 101 to the lens CPU 201 includes focus state detection information. The camera contact 102 includes a signal transmission contact for transmitting signals to the interchangeable lens 200, and a power supply contact for supplying electric power to the interchangeable lens 200.

A power switch 103 can be operated by a user.

The camera CPU 101 is started by operating the power switch 103. Then, each of the actuator and the sensor in the system can be supplied with electric power and the system can be operated.

A two-stage stroke type release switch 104 can be operated by a user.

A signal output from the release switch 104 is input to the camera CPU 101. The camera CPU 101 performs the following operation in response to a signal output from the release switch 104.

When a signal output from the release switch 104 is an ON-signal of the first-stroke switch SW1, the camera CPU 101 causes a photometric circuit 105 to determine an exposure amount. In addition, the focus state of an object in an AF detection area is detected by a focus state detection circuit 106 including an AF sensor.

According to a result of detection of the focus state, an amount of displacement of the second lens unit 12 is determined by the camera CPU 101. Then, a focusing operation is performed by moving the second lens unit 12 in the interchangeable lens 200. Thus, the system becomes ready for photographing.

When it is detected that the second stroke switch (SW2) is operated, the camera CPU 101 sends a diaphragm operating instruction to the lens CPU 201 provided in the interchangeable lens 200.

Then, the camera CPU 101 sends an exposure start instruction to an exposure circuit 107 to perform a mirror-up operation and to release the shutter. Next, photoelectric conversion of an object image formed by the photographic optical system is performed in an imaging unit 108.

The photoelectrically converted signals are further converted into digital data by a signal processing unit 109. The digital data is output therefrom as image data.

The image data is recorded by an image recording unit 110 on a recording medium, such as a semiconductor memory (a flash memory), a magnetic disk, and an optical disk.

The lens CPU 201 controls operation of each unit in the interchangeable lens 200. Also, the lens CPU 201 communicates with the camera CPU 101 via a lens contact 202 when the interchangeable lens 200 is mounted on the camera body 100.

The lens contact 202 includes a signal transmission contact to which signals are transmitted from the camera body 100, and a power supply contact to which electric power is supplied from the camera body 100.

An image stabilization operation switch 203 can be operated by a user to determine whether to perform an image stabilizing operation (image stabilization operation).

An angular vibration detection unit 204 (a vibration detection unit) includes a detection portion that includes a gyroscope, and a calculation output portion.

The detection portion detects an angular velocity of a vertical vibration (pitch direction) and that of a horizontal vibration (yaw direction) of a camera according to an instruction sent from the lens CPU 201.

The calculation output portion performs an electrical integration or a mechanical integration on an output signal of the detection portion to obtain and output a displacement signal to the lens CPU 201.

As described with reference to FIG. 2, the image stabilizing optical mechanism 205 is configured such that the lens barrel 52 that holds the lens 51 is suspended by the compression spring 55 (an elastic member), and that the lens barrel 52 is driven by the driving units in two directions, i.e., the horizontal direction and the vertical direction in a plane perpendicular to the optical axis.

Because the lens barrel 52 is suspended by the compression spring (elastic member) 55 as described above, there is no locking unit for latching the image stabilizing optical unit 14 when the image stabilizer is off.

A position detection unit 206 monitors the position of the image stabilizing optical unit 14 in the plane perpendicular to the optical axis.

When the image stabilizer is on, a correction drive control unit 207 controls and drives the image stabilizing unit 14 within a predetermined correction range in a plane perpendicular to the optical axis, based on a correction range and position set by a correction range and position setting unit 209. The correction range and position setting unit 209 sets a driving range of the image stabilizing optical unit 14 in a plane perpendicular to the optical axis.

The correction drive control unit 207 determines a target displacement position (target driving position) of the image stabilizing optical unit 14, which is movable in a direction perpendicular to the optical axis, based on a vibration detection information output from the angular vibration detection unit 204.

The correction drive control unit 207 drives the image stabilizing unit 14 to the target displacement position by performing feedback control based on the difference between a displacement position detected by the position detection unit 206 and the target displacement position.

Incidentally, when the image stabilizer is off, the image stabilizing unit 14 is moved in the plane perpendicular to the optical axis to the position set by the correction range and position setting unit 209. Then, the image stabilizing optical unit 14 is controlled to maintain the position thereof.

A gravitational direction determination unit 208 determines the gravitational direction.

When the image stabilizer is off, the gravitational direction determination unit 208 determines a gravitational direction based on the positional information of the image stabilizing optical unit 14, output from the position detection unit 206, in the plane perpendicular to the optical axis thereof, and on the information of the position of the optical axis center of the photographic optical system.

When the image stabilizer is on, the gravitational direction determination unit 208 determines the gravitational direction based on the positional information of the image stabilizing optical unit 14, output from the position detection unit 206, in the plane perpendicular to the optical axis thereof, and on the information of the position of the optical axis center of the photographic optical system, which is obtained by detecting a driving voltage supplied by the correction drive control unit 207 and corresponding to a target driving position.

A method for detecting the gravitational direction will be described below in detail with reference to FIGS. 5A and 5B.

The correction range and position setting unit 209 sets a drive range of the image stabilizing optical unit 14 in the plane perpendicular to the optical axis.

More particularly, the correction range and position setting unit 209 sets the correction range when the image stabilizer is on, and the position for holding the image stabilizing optical unit 14 when the image stabilizer is off, based on the gravitational direction information from the gravitational direction determination unit 208 and on the focal length information from a focal length detection unit 210.

The focal length detection unit 210 includes a zoom encoder and detects a zoom position of the photographic optical system.

The focal length detection unit 210 outputs information concerning the focal length to the lens CPU 201.

A focus unit 211 includes a focus drive portion (corresponding to the AF drive motor 16 illustrated in FIG. 1) controlled by the lens CPU 201 based on information concerning the driving amount of a focus lens unit (corresponding to the second lens unit 12 illustrated in FIG. 1) to be in focus, sent from the camera CPU 101, and includes also the focus lens unit (corresponding to the second lens unit 12 in FIG. 1).

A diaphragm unit 212 (corresponding to the diaphragm 15 illustrated in FIG. 1) includes a diaphragm drive portion controlled by the lens CPU 201 based on a diaphragm operating instruction sent from the camera CPU 101, and diaphragm blades driven by the diaphragm drive portion to define an aperture area.

Figure 4:
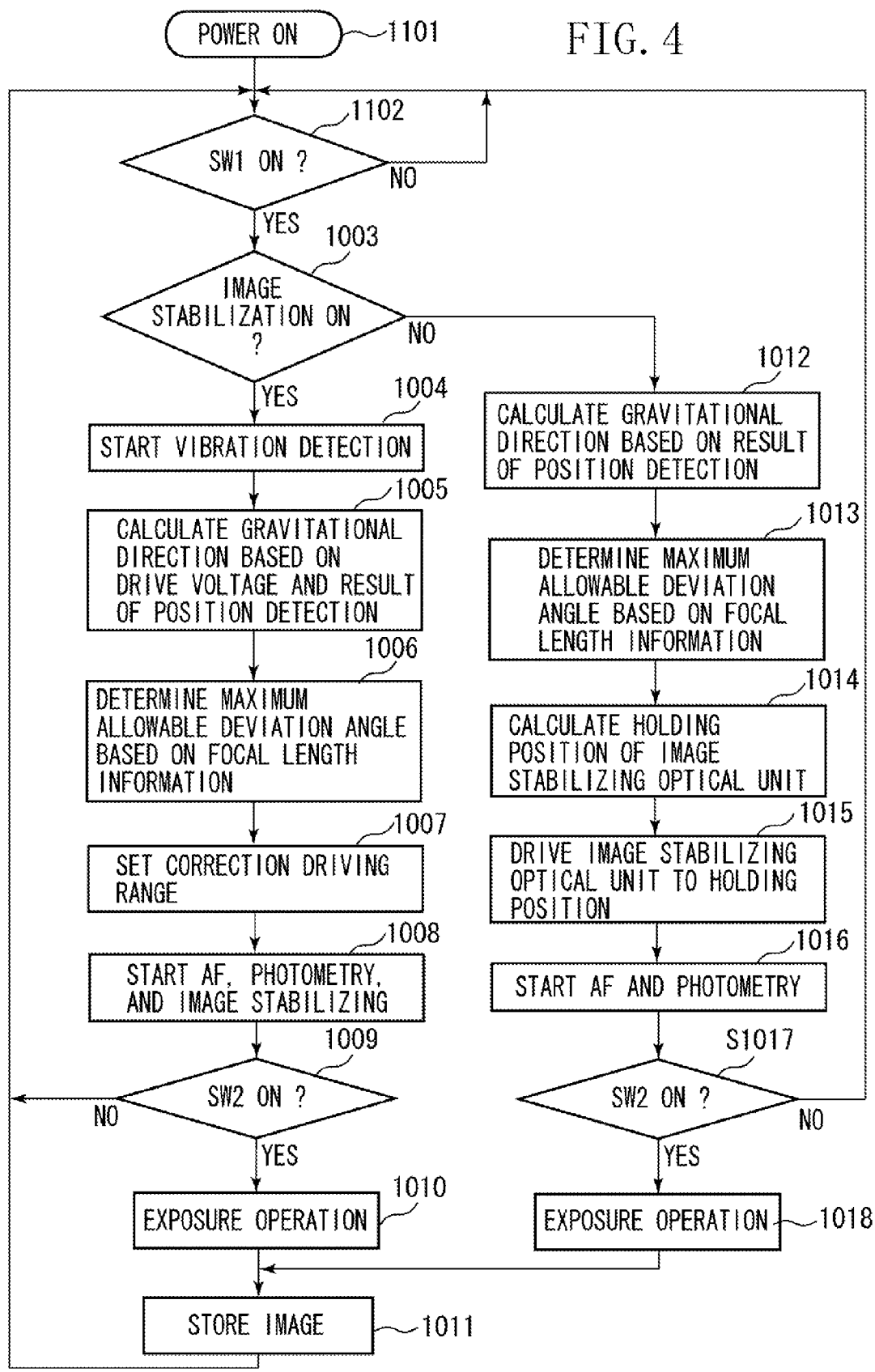
FIG. 4 is a flowchart illustrating operation of the camera system illustrated in FIG. 3.

FIG. 4 is a flowchart illustrating a main operation of the camera system illustrated in FIG. 3.

First, in step 1001, the power switch 103 of the camera body 100 is turned on.

Consequently, the system starts to supply electric power to the interchangeable lens 200.

Incidentally, when a new battery is set or when the interchangeable lens 200 is attached to the camera body 100, the camera body 100 and the interchangeable lens 200 start to communicate with each other.

Next, in step 1002, the camera CPU 101 determines whether an SW1 signal is output from the release switch 104.

If the SW1 signal is output (YES in step 1002), then in step 1003, the lens CPU 201 determines whether the image stabilization operation switch 203 is on (i.e., an image stabilization mode (IS mode) is on).

If IS mode is on (YES in step 1003), then the processing proceeds to step 1004. If IS mode is off (NO in step 1003), then the processing proceeds to step 1012.

In step 1004, the lens CPU 201 starts detection of a vibration. In step 1005, the lens CPU 201 calculates a gravitational direction based on information concerning a drive voltage corresponding to the target driving position, which is applied to the correction drive control unit 207, and on a positional information of the image stabilizing optical unit 14.

Next, in step 1006, the lens CPU 201 calculates an optically allowable amount of displacement from the optical axis based on the focal length information. In step 1007, the lens CPU 201 determines a correction center position and a correction range of the image stabilizing optical unit 14 based on information concerning the gravitational direction and the allowable amount of displacement.

The process performed in steps 1005 through 1007 is executed repeatedly at a predetermined timing to update the correction center and the correction range.

Next, in step 1008, the camera CPU 101 starts photometry (light metering) and AF (ranging), and the lens CPU 201 starts AF control (focusing) and image stabilization.

The camera CPU 101 and the lens CPU 201 repeat a loop of steps 1002 through 1008 and stand by in step 1009 until the switch SW2 is turned on by performing a full pressing of the release button.

If the switch SW2 is turned on (YES in step 1009), the processing proceeds to step 1010.

In step 1010, the camera CPU 101 starts an exposure operation. During the exposure operation, the lens CPU 201 continues image stabilizing.

In step 1011, the camera CPU 101 stores an exposed image. Then, the processing returns to step 1002.

In step 1012, the lens CPU 201 calculates a gravitational direction based on information concerning the position of the image stabilizing optical unit 14.

Next, in step 1013, the lens CPU 201 calculates an optically allowable amount of displacement from the optical axis based on the focal length information. In step 1014, the lens CPU 201 determines a holding position of the image stabilizing optical unit 14 based on the gravitational direction information and information concerning the optically allowable amount of displacement.

Next, in step 1015, the lens CPU 201 drives the image stabilizing optical unit 14 to the holding position determined in step 1014. Then, the lens CPU 201 electrically holds the image stabilizing optical unit 14 at the determined holding position.

The process performed in steps 1012 through 1015 is executed repeatedly at a predetermined timing to update the holding position.

Next, in step 1016, the camera CPU 101 performs AF (ranging operation), and photometry (light metering). Then, the processing proceeds to step 1017. In step 1017, the camera CPU 101 and the lens CPU 201 repeat a loop of steps 1002 through 1017 and stand by in step 1017 until the switch SW2 is turned on by performing a full pressing of the release button.

If the switch SW2 is turned on (YES in step 1017), the processing proceeds to step 1018, in which the camera CPU 101 performs an exposure operation without performing image stabilizing.

The lens-interchangeable type SLR digital camera system according to an exemplary embodiment of the present invention repeats the above-described sequence of operations until the power switch 103 is turned off. If the power switch 103 is turned off, the communication between the camera CPU 101 and the lens CPU 201 is terminated. In addition, the supply of electric power to the interchangeable lens 200 ceases.

Next, a method for calculating the gravitational direction is described with reference to FIGS. 5A and 5B.

The image stabilizing optical unit 14 is held by elastic members. Thus, if the spring characteristics of the elastic members are linear, the driving force from the correction drive control unit 207 is substantially proportional to an amount of displacement from a balanced position of the image stabilizing optical unit 14.

The acceleration needed for driving affects the driving force. However, it is presumed that an acceleration needed for image-stabilizing is so low as to be negligible.

If each driving unit is composed of a voice coil and a permanent magnet, an energizing voltage supplied to each driving unit (voice coil in the case of the present embodiment) is substantially proportional to the driving force.

Accordingly, the detected energizing voltage can be converted into an amount of displacement.

For example, the detection position center of the position detection unit 206 is presumed to be aligned with the optical axis of the image stabilizing unit 14 in a state in which there is no deflection in the elastic members (i.e., in a position in which the image stabilizing unit 14 does not drop due to its weight.

In this case, the difference between the displacement detected by the position detection unit 206 and the displacement amount converted from the driving voltage of the image stabilizing optical unit 14 is equal to a displacement amount due to the self-weight drop of the image stabilizing optical unit 14. Accordingly, the gravitational direction can be calculated.

Figure 5A:
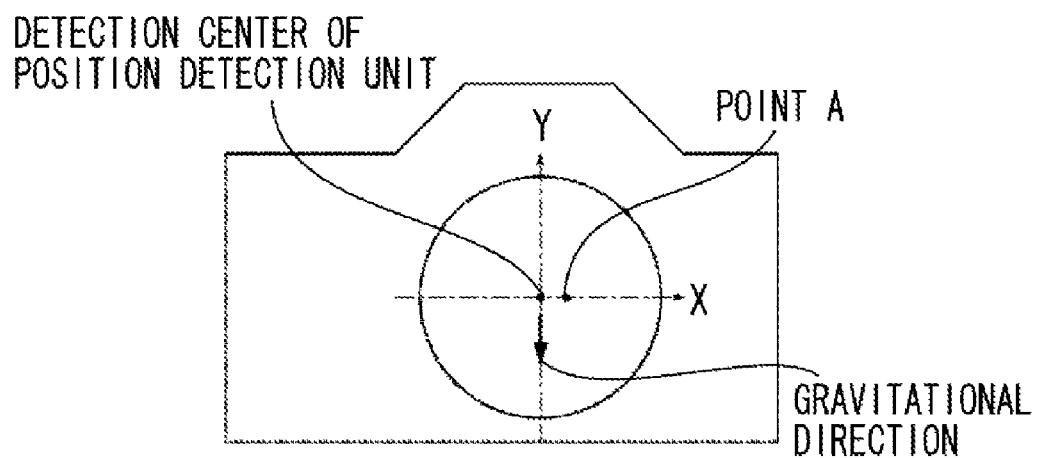
FIGS. 5A and 5B are schematic diagrams illustrating how the gravitational direction is determined.

FIG. 5A illustrates a case where the camera is held in a horizontal position. In this state, suppose, if the optical axis of the image stabilizing optical unit 14 is located at point A, the position of point A will be determined in two ways such as a the displacement calculated by converting the driving voltage of the image stabilizing optical unit 14 and the displacement detected by the position detection unit 206 as described bellow.

the displacement (X, Y) calculated by converting the supplied driving voltage: (X, Y)=(0.5 mm, 0.2 mm).

the displacement (X, Y) detected by the position detection unit 206: (X, Y)=(0.5 mm, 0 mm).

The displacement obtained by the calculation shown bellow indicates the balancing point between the self-weight of the image stabilizing optical unit 14 and the elastic force of the elastic member.

{(the displacement detected by the position detection unit 206)–(the displacement calculated by converting the supplied driving voltage)}=(–0.2 mm,0 mm).

Figure 5B:
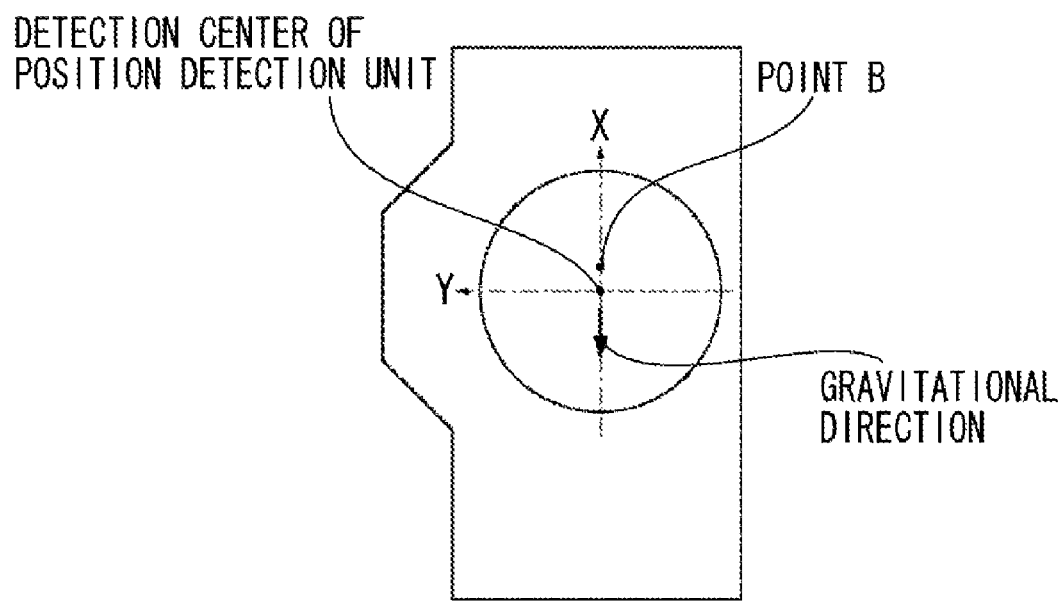

FIG. 5B illustrates a case where the camera is held in a vertical position. In this state, if the optical axis of the image stabilizing optical unit 14 is located at point B, the position of point B will be obtained in two ways as the displacement calculated by converting the driving voltage of the image stabilizing optical unit 14 and the displacement detected by the position detection unit 206 as described below.

the displacement (X, Y) calculated by converting the supplied driving voltage: (X, Y)=(0.7 mm, 0 mm).

the displacement (X, Y) detected by the position detection unit 206: (X, Y)=(0.5 mm, 0 mm).

The displacement obtained by the calculation bellow indicates the balancing point between the self-weight of the image stabilizing optical unit 14 and the elastic force of the elastic member.

{(the displacement detected by the position detection unit 206)–(the displacement calculated by converting the supplied driving voltage)}=(–0.2 mm,0 mm)

Consequently, a gravitational direction can be determined based on the X and Y components (X, Y) of each of the balanced positions.

Next, a change of each of the holding position and the driving range, which correspond to each focal length, is described below with reference to FIG. 6.

Hereinafter, correction ranges under the following conditions, based on examples of a shift sensitivity corresponding to each focal length, an optically allowable maximum deviation angle with respect to a main optical axis, and a correction deviation angle during image stabilization, are described.

The shift sensitivity at the telephoto end is 1 deg/mm (a deviation angle is 1 degree when the image stabilizing optical unit 14 is displaced 1 mm).

The shift sensitivity at the wide-angle end is 2 deg/mm (a deviation angle is 2 degrees when the image stabilizing optical unit 14 is displaced 1 mm).

The allowable deviation angle at the telephoto end is 0.5 degrees (a deviation angle and an amount of displacement due to a shift of the optical axis of the image stabilizing optical unit 14 with respect to a main optical axis are 0.5 degrees and 0.5 mm, respectively).

The allowable deviation angle at the wide-angle end is 0.5 degrees (a deviation angle and an amount of displacement due to a shift of the optical axis of the image stabilizing optical unit 14 with respect to a main optical axis are 0.5 degrees and 0.25 mm, respectively).

The correction angle at the telephoto end is ±0.3 degrees (corresponding to a case where the displacement of the image stabilizing optical unit 14 is ±0.3 mm).

The correction angle at the wide-angle end is ±0.3 degrees (corresponding to a case where the displacement of the image stabilizing optical unit 14 is ±0.15 mm).

Figure 6:
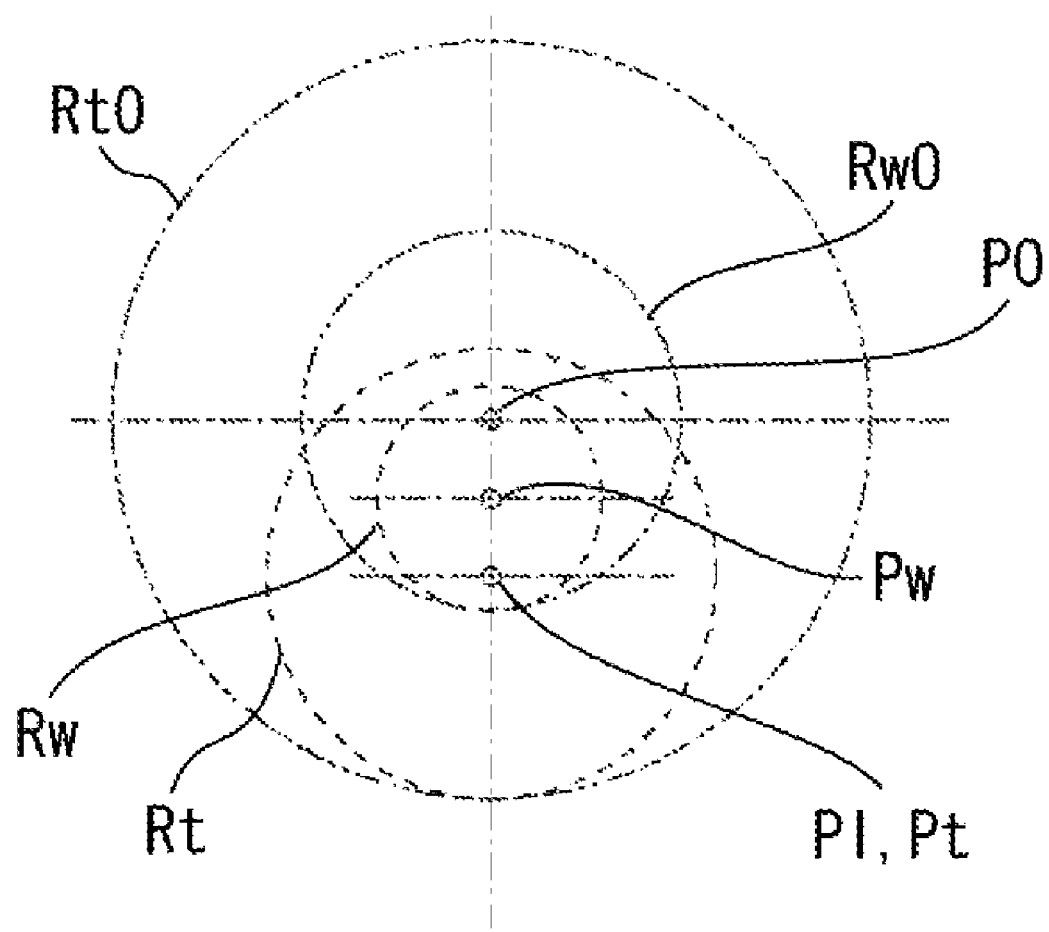
FIG. 6 is a diagram illustrating a correction range corresponding to each focal length.

As illustrated in FIG. 6, the optical axis of the image stabilizing optical unit 14 is displaced to point P1 from the main optical axis P0 due to the balance between the elastic force of the elastic member and the self-weight of the image stabilizing optical unit 14 before the switch SW1 is turned on. According to the present embodiment, the optical axis of the image stabilizing optical unit 14 is presumed to displace 0.2 mm due to the self-weight thereof with respect to the main optical axis P0.

The deviation angle corresponding to the displacement of the optical axis of the image stabilizing optical unit 14 varies with the focal length of the photographic optical system. When the focal length of the photographic optical system is a focal length at the telephoto end, the deviation angle is 0.2 degrees. On the other hand, when the focal length of the photographic optical system is a focal length at the wide-angle end, the deviation angle is 0.4 degrees.

Next, a correction range of the image stabilizing optical unit 14 at the telephoto end when the image stabilization mode is on is described below.

When the focal length is detected to be the telephoto end by the focal length detection unit 210, an optically allowable deviation angle range Rt0 (the maximum deviation angle is 0.5 degrees, and an amount of displacement is 0.5 mm) is determined.

Then, a correction range center Pt and a correction range Rt dropped in the gravitational direction are determined within the allowable deviation angle range Rt0 based on the gravitational direction information from the gravitational direction determination unit 208.

In this case, the self-weight drop position 0.2 degrees ((the amount of displacement is 0.2 mm) is set to be the correction range center of the image stabilizing unit 14. In addition, image stabilizing is performed under the condition that the correction deviation angle is ±0.3 degrees (the amount of displacement thereof is ±0.3 mm).

When the focal length of the photographic optical system is a focal length at the telephoto end, the correction range center Pt is the same as the self-weight drop position P1. Thus, after the switch SW1 is turned on, image stabilizing is performed using this point Pt as a starting point.

Next, a correction range of the image stabilizing optical unit 14 at the wide-angle end when the image stabilization mode is on is described below.

When the focal length is detected to be the wide-angle end by the focal length detection unit 210, an optically allowable deviation angle range Rw0 (the maximum deviation angle is 0.5 degrees, and an amount of displacement is 0.25 mm) is determined.

Then, a correction range center Pw and a correction range Rw dropped in the gravitational direction are determined within the allowable deviation angle range Rt0 based on the gravitational direction information output from the gravitational direction determination unit 208.

In this case, a position (the deviation angle is 0.2 degrees, which equals the amount of displacement of 0.1 mm) differing from the self-weight drop position of the image stabilizing unit 14 is set to be the correction range center. In addition, image stabilizing is performed under the condition that the correction deviation angle is ±0.3 degrees corresponding to the displacement amount of ±0.15 mm.

At the wide-angle end, the correction range center Pw differs from the self-weight drop position P1. Thus, after the switch SW1 is turned on, the optical axis of the image stabilizing unit 14 is moved to point Pw at such a speed that a photographer does not feel uncomfortable when observing an image through a finder. Then, image stabilizing is performed using this point Pt as a starting point.

Hereinafter, with reference to FIG. 7, a driving thrust force needed for the image-stabilizing driving when the image-stabilizing driving is performed within the determined image stabilizing correction range is described.

The magnitude of the driving thrust force for driving the image stabilizing unit 14 is 0 at the position P1 at which the self-weight of the image stabilizing optical unit 14 balances with the elastic force of the elastic member.

If the spring characteristic of the elastic member for urging the image stabilizing unit 14 is linear, it is necessary that the magnitude of the driving thrust force is proportional to the distance from the self-weight drop position P1.

Figure 7:
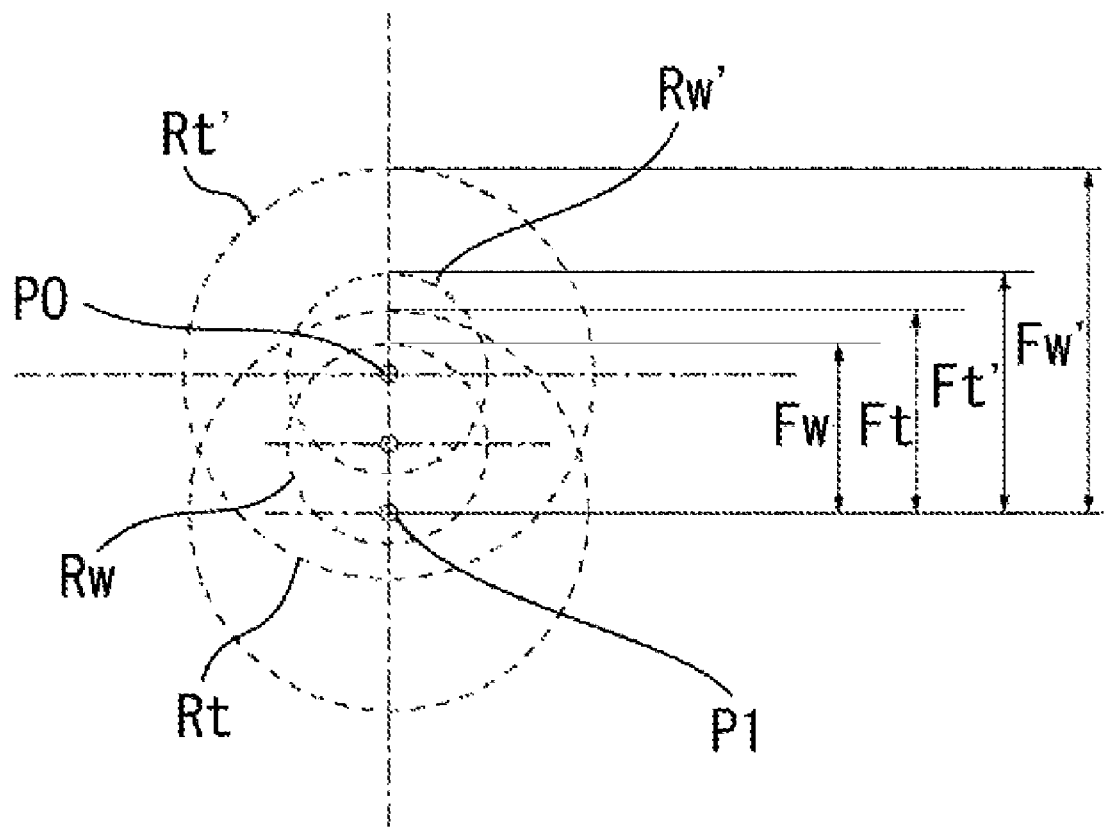
FIG. 7 is a diagram illustrating a driving force needed for image-stabilizing within the correction range corresponding to each focal length.

Referring to FIG. 7, the thrust forces needed for driving the image stabilizing unit 14 at the telephoto end and the wide-angle end are compared with each other when correction ranges (the correction ranges Rt and Rw) are set based on the respective focal lengths (the focal length at the telephoto end and the focal length at the wide-angle end).

The thrust force is represented in terms of the distance from point P1 in FIG. 7, because the magnitude of the driving thrust force is proportional to the displacement from point P1.

In FIG. 7, a driving thrust force Ft is the maximum force in the correction range Rt corresponding to the focal length at the telephoto end. A driving thrust force Fw is the maximum force in the correction range Rw corresponding to the focal length at the wide-angle end.

In addition, similar correction amounts (at the telephoto end, the correction deviation angle is ±0.3 degrees corresponding to ±0.3 mm displacement, and at the wide-angle end, the correction deviation angle is ±0.3 degrees corresponding to ±0.15 mm displacement) are determined with the main optical axis P0 as the correction range center. For reference, FIG. 7 illustrates also driving forces Ft' and Fw' The driving thrust force Ft' is the maximum force in the correction range Rt' corresponding to the telephoto end. The driving thrust force Fw' is the maximum force in the correction range Rw' corresponding to the wide-angle end.

It is understood according to this comparison that the driving thrust force is reduced compared with a case where image stabilizing is performed around the main optical axis center as the correction range center.

This is because a thrust force for lifting the self-weight of the image stabilizing unit 14 is needed in addition to the driving thrust force in order to set the main optical axis as the correction range center.

Additionally, the driving voltage needed for driving the image stabilizing unit 14 is proportional to the driving thrust force. Thus, as is understood from the above-described result of image stabilizing, electric power can be saved as much as the amount of reduction in the driving thrust force.

In the foregoing description, it has been described that the image stabilizing unit 14 is driven and held according to the allowable deviation angle determined corresponding to the focal length even when the image stabilization operation mode is off. However, if the spring constant of the elastic member is large so that the deviation angle corresponding to the self-weight drop position is sufficiently small in comparison with the allowable deviation angle, it is unnecessary to drive the image stabilizing unit 14.

According to the above-described exemplary embodiment, when the image stabilization mode is selected, the driving range of the image stabilizing unit 14 is determined based on the gravitational information output from the gravitational direction determination unit 208 and the focal length information output from the focal length detection unit 210.

Then, correction driving is performed around the dropped point caused by the weight of the image stabilizing unit 14 itself within the optically allowable deviation angle determined corresponding to each focal length. Thus, the voltage supplied to the driving units can be reduced while the optical performance is satisfied.

In addition, the gravitational direction determination unit 208 detects the gravitational direction based on the detected position of the image stabilizing optical unit 14 and on the driving voltage corresponding to the target driving position, which is input to the correction drive control unit 207. Consequently, the correction range can be updated even in the middle of image stabilizing. Accordingly, even when the photographing posture changes during image stabilization, electric power can be saved at all times with keeping the optically allowable range.

When an image stabilization mode is not selected, the position of the image stabilizing unit 14 is determined based on the gravitational direction information output from the gravitational direction determination unit 208 and on the focal length information output from the focal length detection unit 210.

Accordingly, the image stabilizing unit 14 is held at the self-weight drop point in an optically allowable range of the deviation angle corresponding to each focal length, and thus good optical performance and electric power saving can be achieved together.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-245543 filed Sep. 21, 2007, which is hereby incorporated by reference herein in its entirety.

What is claimed is:

1. A lens apparatus attachable to a camera body, the lens apparatus comprising:
    a photographic optical system including an image stabilizing unit supported by a support member via a plurality of elastic members;
    an actuator configured to drive the image stabilizing unit in a direction perpendicular to an optical axis thereof;
    a position detection unit configured to detect a position of the image stabilizing unit in the direction perpendicular to the optical axis;
    a gravitational direction determination unit configured to determine a gravitational direction based on an output from the position detection unit;
    a focal length detection unit configured to detect a focal length of the photographic optical system;
    a setting unit configured to set a holding position at which the image stabilizing unit is held based on information concerning the gravitational direction output from the gravitational direction determination unit, wherein the setting unit sets the holding position at which the image stabilizing unit is held based on the information concerning the gravitational direction output from the gravitational direction determination unit and information concerning the focal length output from the focal length detection unit; and
    a control unit configured to control the actuator based on information concerning a holding position to move the image stabilizing optical unit to the holding position.

2. The lens apparatus attachable to a camera body according to claim 1, wherein the setting unit obtains an optically allowable amount of displacement from the optical axis based on the information concerning the focal length output from the focal length detection unit, and sets the holding position at which the image stabilizing unit is held based on the information concerning the gravitational direction output from the gravitational direction determination unit and the optically allowable amount of displacement from the optical axis.

3. A lens apparatus attachable to a camera body, the lens apparatus comprising:
a photographic optical system including an image stabilizing unit supported by a support member via a plurality of elastic members;
an actuator configured to drive the image stabilizing unit in a direction perpendicular to an optical axis thereof;
a vibration detection unit configured to detect a vibration of the lens apparatus;
a position detection unit configured to detect a position of the image stabilizing unit in the direction perpendicular to the optical axis;
a gravitational direction determination unit configured to determine a gravitational direction based on information concerning a driving target position of the image stabilizing unit determined according to an output from the vibration detection unit and on the output from the position detection unit;
a focal length detection unit configured to detect a focal length of the photographic optical system;
a setting unit configured to set a driving range in the direction perpendicular to the optical axis of the image stabilizing unit based on information concerning the gravitational direction output from the gravitational direction determination unit, wherein the setting unit sets the center of the driving range in the direction perpendicular to the optical axis of the image stabilizing unit based on the information concerning the gravitational direction output from the gravitational direction determination unit and information concerning the focal length output from the focal length detection unit when the image stabilization operation of the image stabilizing unit is on; and
a control unit configured to control the actuator based on an output from the vibration detection unit and information concerning the driving range to move the image stabilizing unit.

4. The lens apparatus attachable to a camera body according to claim 3, wherein the setting unit obtains an optically allowable amount of displacement from the optical axis based on the information concerning the focal length output from the focal length detection unit, and sets the center of the driving range of the image stabilizing unit based on the information concerning the gravitational direction output from the gravitational direction determination unit and the optically allowable amount of displacement from the optical axis.

5. The lens apparatus attachable to a camera body according to claim 4, wherein the setting unit obtains an optically allowable deviation angle range based on the information concerning the focal length output from the focal length detection unit, and sets the center of the driving range of the image stabilizing unit based on the information concerning the gravitational direction output from the gravitational direction determination unit such that the driving range of the image stabilizing unit is entirely within the optically allowable deviation angle range.

6. A camera including:
a photographic optical system including an image stabilizing optical unit supported by a support member via a plurality of elastic members;
an actuator configured to drive the image stabilizing unit in a direction perpendicular to an optical axis thereof;
a position detection unit configured to detect a position of the image stabilizing unit in the direction perpendicular to the optical axis;
a gravitational direction determination unit configured to determine a gravitational direction based on an output from the position detection unit;
a focal length detection unit configured to detect a focal length of the photographic optical system;
a setting unit configured to set a holding position at which the image stabilizing optical unit is held based on information concerning the gravitational direction output from the gravitational direction determination unit, wherein the setting unit sets the holding position at which the image stabilizing unit is held based on the information concerning the gravitational direction output from the gravitational direction determination unit and information concerning the focal length output from the focal length detection unit; and
a control unit configured to control the actuator based on information concerning the holding position to move the image stabilizing unit to the holding position.

7. A camera including:
a photographic optical system including an image stabilizing unit supported by a stationary member via a plurality of elastic members;
an actuator configured to drive the image stabilizing unit in a direction perpendicular to an optical axis thereof;
a vibration detection unit configured to detect a vibration of the camera;
a position detection unit configured to detect a position of the image stabilizing unit in said direction perpendicular to the optical axis;
a gravitational direction determination unit configured to determine a gravitational direction based on information concerning a driving target position of the image stabilizing unit determined according to an output from the vibration detection unit and on the output from the position detection unit;
a focal length detection unit configured to detect a focal length of the photographic optical system;
a setting unit configured to set a driving range in the direction perpendicular to the optical axis of the image stabilizing unit based on information concerning the gravitational direction output from the gravitational direction determination unit, wherein the setting unit sets the center of the driving range in the direction perpendicular to the optical axis of the image stabilizing unit based on the information concerning the gravitational direction output from the gravitational direction determination unit and information concerning the focal length output from the focal length detection unit when the image stabilization operation of the image stabilizing unit is on; and
a control unit configured to control the actuator based on an output from the vibration detection unit and information concerning the driving range to move the image stabilizing unit.

* * * * *